No. 799,404. PATENTED SEPT. 12, 1905.
E. ROST.
TRUCK FOR AERIAL RAILWAYS.
APPLICATION FILED FEB. 16, 1905.

Witnesses: Inventor:
Ernst Rost,
By Wm. E. Coulter,
Attorney.

UNITED STATES PATENT OFFICE.

ERNST ROST, OF DRESDEN, GERMANY.

TRUCK FOR AERIAL RAILWAYS.

No. 799,404.      Specification of Letters Patent.      Patented Sept. 12, 1905.

Application filed February 16, 1905. Serial No. 245,863.

*To all whom it may concern:*

Be it known that I, ERNST ROST, a subject of the German Emperor, and a resident of Dresden, Germany, have invented certain new and useful Improvements in Trucks for Aerial Railways, of which the following is a specification.

The object of this invention is to provide a truck for aerial railways which shall reduce the strain on the wire rope or other form of wheel-truck by suspending the load from several wheels instead of from one or two wheels only, as heretofore, thus distributing the total load upon them either equally or in any other desired manner. In the case of a rope-railway in addition to the tensional strain on the rope resulting from the load there is also a bending strain. The latter, which is the more detrimental for the rope, has in the case of one wheel its maximum intensity at the momentary point of contact between the rope and the wheel, this intensity depending in a great measure upon the radius of the wheel, but chiefly upon the pressure of the latter. It necessarily follows that a reduction of the wheel-pressure will diminish the wear and tear on the rope, and to effect this for a given load the latter is, according to the present invention, distributed over several wheels in such a way as to insure the desired result and the maintenance of the same on the variable slope of the wheel-track. The invention, however, is not restricted to rope-railways only, but can be applied to any kind of railway in which the car or load is suspended from overhead wheels, the advantages being the same whenever the wear and tear of rigid rails on which the wheels run is in question.

Figure 1:
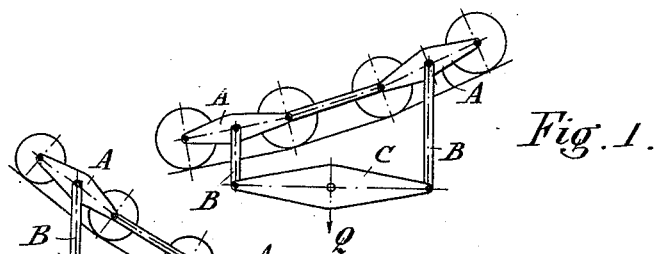
Figure 2:
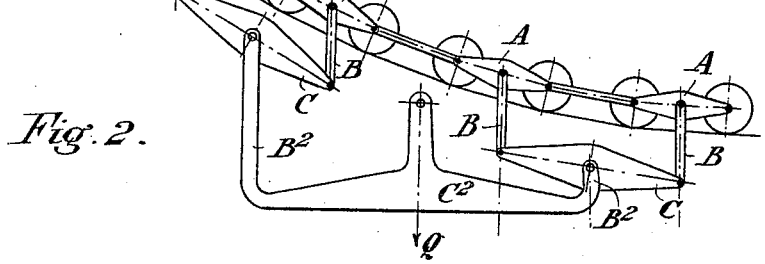
Figure 3:
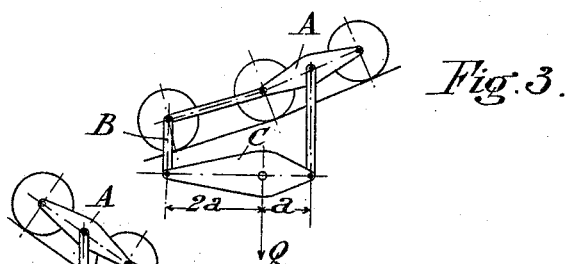
Figure 4:
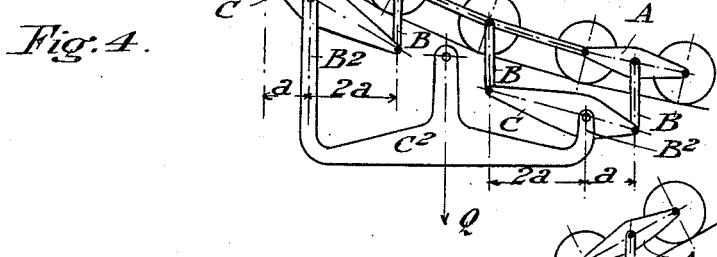
Figure 5:
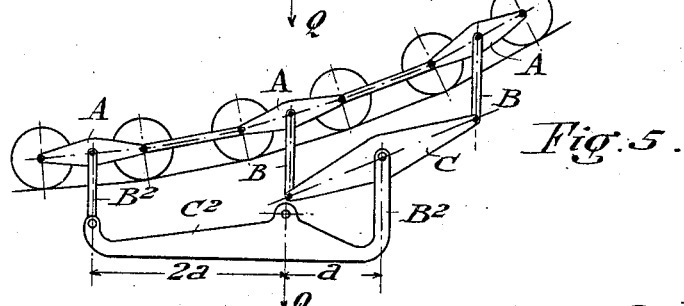

Referring to the accompanying drawings, showing various forms and modifications of the invention, Figure 1 illustrates a form of the invention wherein the load is distributed equally over four wheels. Fig. 2 illustrates a form wherein eight wheels are employed. Fig. 3 illustrates a form wherein the load is distributed over three wheels. Figs. 4 and 5 illustrate two ways in which the load is distributed over six wheels.

Fig. 1 shows a form of the invention employed to distribute the load equally over four wheels. For this purpose the wheels are connected in pairs by connecting-beams A, to which are jointed at a point in each beam equally distant from the axes of the wheels of the respective pair suspension rods or bars B, carrying at their lower ends the beam C, with which the load Q is so connected that its center of gravity is equally distant from the two vertical rods B. To render the distribution of the load practically independent of the position of the truck on the rope, either the rods B are lengthened and shortened by any suitable device in such a way that the beam C preserves its original position—the horizontal position, for instance—which may be desirable for other reasons as well, or the joints on the connecting-beams A are disposed in the straight lines connecting the axes of the wheels of each pair, while the beam C, which must in this case have joint connections with the rods and load, carries the load Q in a point lying on the straight line through the end joints, as illustrated.

To distribute the load equally on eight wheels, a duplication of the arrangement just described is made, necessitating, as Fig. 2 shows, two beams C, from whose centers rods $B^2$ descend, carrying the final beam $C^2$, supporting the load.

In the case of three wheels equal wheel-pressures are obtained by suspending one rod B from one wheel and the other rod B from the center of the connecting-beam of the other two wheels and connecting the load to the beam carried by the two rods B in such a way that the length of the beam-arms (denoted as $a$ and $2^a$ in Fig. 3) shall be in the ratio of one to two, these lengths being the parts of the connecting-line of the end points of the beam cut by the vertical line passing through the center of gravity of the load.

Figs. 4 and 5 show two ways of applying the present invention for the equal distribution of the load on six wheels, which will be clearly understood from the foregoing description in connection with the figures. When other combinations of wheels are employed, it is sometimes necessary to resort to other ratios for the lengths of the arms of the beams. The equal distribution of the load is not always the most desirable. In some cases it may be preferable to give some or all of the outer wheels a greater or less portion of the load than the inner ones. Any desired distribution of the load, however, may be obtained with trucks according to this invention by a proper choice of the lengths of the arms of the beams. In all cases the distribution may be rendered approximately independent of the varying inclination of the rope or track either by an appropriate lengthening and shortening of the suspending-rods of the final or intermediate beams, in which case the final beam need have no joint connections with its rods or the load, or by disposing the inner joint of each beam on a straight line with the two outer joints or with the two axes of the pair of wheels.

Having now fully described my said invention, what I claim, and desire to secure by Letters Patent, is—

1. In a truck for aerial railways, a series of suspending rods and beams disposed between the wheels and the lowest beam receiving or embodying the load or car, each intermediate beam being jointed to three rods and each end rod of a beam forming the middle rod of a beam above it, for the purpose of distributing the load over more than two wheels as described.

2. In a truck for aerial railways the combination with a plurality of wheels, of a beam from which the load is directly supported, a rod extending upwardly from each end of the beam, the point at which the load is supported being intermediate the said rods, means pivotally connecting one of said rods with some of the wheels and means pivotally connecting the other of said rods with the remainder of the wheels.

3. In a truck for aerial railways, the combination with a plurality of wheels, of a beam from which the load is directly supported, a rod extending upwardly from each end of said beam, the point at which the load is supported being intermediate the said rods, and means pivotally connecting said rods with the wheels comprising a beam pivotally connected with each of said upwardly-extending rods.

4. In a truck for aerial railways, the combination with a plurality of wheels, of a beam from which the load is directly supported, a rod extending upwardly from each end of the beam, a beam pivotally connected intermediate its ends with each of said rods, further rods extending upwardly from the ends of the last-mentioned rods are pivotally connected.

In testimony whereof I have hereunto set my hand in presence of two witnesses.

ERNST ROST.

Witnesses:
　CHEMNITZ H. SCHILLING,
　PAUL ARRAS.